United States Patent [19]

Shimizu

[11] Patent Number: 5,482,130

[45] Date of Patent: Jan. 9, 1996

[54] VARIABLE RATIO STEERING SYSTEM

[75] Inventor: Yasuo Shimizu, Saitama, Japan

[73] Assignee: Honda Giken Kogyo Kabushiki Kaisha, Tokyo, Japan

[21] Appl. No.: 191,659

[22] Filed: Feb. 4, 1994

[30] Foreign Application Priority Data

Feb. 4, 1993 [JP] Japan .................................. 5-042029

[51] Int. Cl.$^6$ ..................................................... B62D 5/02
[52] U.S. Cl. ........................................ 180/79.3; 180/79.1
[58] Field of Search .......................... 180/79, 79.3, 79.1, 180/79.4; 280/95.1, 96, 846

[56] References Cited

U.S. PATENT DOCUMENTS

| 5,050,697 | 9/1991 | Umemura | 180/79.3 X |
| 5,174,407 | 12/1992 | Shimizu et al. | 180/79.3 X |
| 5,267,625 | 12/1993 | Shimizu | 180/79.1 |
| 5,284,219 | 2/1994 | Shimizu et al. | 180/79.3 X |

FOREIGN PATENT DOCUMENTS 4236771  5/1993  Germany .................. 180/79.3

*Primary Examiner*—Margaret A. Focarino
*Assistant Examiner*—F. Zeender
*Attorney, Agent, or Firm*—Nikaido, Marmelstein, Murray & Oram

[57] ABSTRACT

Provided is a variable ratio steering system for a vehicle which can maintain the relationship between the steering angle at the steering wheel and the behavior of the vehicle substantially constant without regard to the travelling speed of the vehicle. A rotational movement of a steering wheel is converted into a linear movement of a conversion shaft which is provided with a radial pin. An annular rocking movement member consisting of an outer ring and an inner ring surrounds the conversion shaft. The outer ring is rotatably supported by a casing so that its inclination angle relative to the axial line of the conversion shaft may be varied, and the inner ring is coaxially and freely rotatably received in the outer ring. The radial pin of the conversion shaft engages with the inner ring via a spherical joint. Therefore, the linear movement of the conversion shaft is converted into a rotational movement of the conversion shaft which is in turn converted into a steering movement. Thus, by varying the inclination angle of the outer ring in dependence on the vehicle speed, the ratio of the steering angle of the steerable wheels to the steering input can be varied so that both responsive handling in a low to medium speed range and stability in a high speed range can be obtained.

7 Claims, 12 Drawing Sheets

1

VARIABLE RATIO STEERING SYSTEM

TECHNICAL FIELD

The present invention relates to a variable ratio steering system for a vehicle which can vary a ratio of a steering angle of steerable wheels or ground wheels to a steering angle of a steering wheel, or a steering angle ratio.

BACKGROUND OF THE INVENTION

In recent years, most automotive steering systems generally use a rack and pinion mechanism as illustrated in FIG. 10. As well known in the art, a rotational movement of a pinion 4, which is connected, via a connecting shaft 3 including a universal joint, to a steering shaft 2 integrally carrying a steering wheel 1, is converted into a linear movement of a rack 5 meshing with the pinion 4, and the linear movement of the rack 5 is in turn converted into a steering movement of steerable wheels 8 via tie rods 6 and knuckle arms 7.

According to such a conventional steering system, the steering angle of the steerable wheels has a linear steering property, or, in other words, changes substantially linearly with the rotational angle of the steering wheel, but, in terms of the maneuverability of the vehicle, the rotational angle of the steering wheel for achieving a maximum steering angle of the steerable wheels is desired to be relatively small.

For instance, when the steering angle property is set as indicated by a chain-dot line (a) of FIG. 11, the rotational angle of the steering wheel is kept small, and a favorable maneuverability can be achieved in a low speed range. However, in a high speed range, the behavior of the vehicle becomes excessively sensitive to the steering angle of the steering wheel, and the vehicle operator is required to be careful not to excessively turn the steering wheel. This is because the relation between the steering angle of the steering wheel and the behavior of the vehicle is not fixed, or, more specifically, the yaw response of the vehicle for a given steering angle of the steering wheel depends on the vehicle speed. For instance, as the vehicle speed increases, the yaw response of the vehicle tends to become increasingly more sensitive.

For this reason, the steering property of a vehicle is generally determined as a compromise so that the maximum steering angle of the road wheels may be achieved when the steering wheel is turned by 1.5 turns in either direction from its neutral position, and the stability of the vehicle in a high speed range may be ensured (refer to the fine solid line (b) of FIG. 11) while achieving a tolerable level of maneuverability in a low speed range.

However, when the actual steering angle of the steering wheel is measured in relation with the vehicle speed, it can be found that the steering angle at the steering wheel tends to be excessive in a low speed range as indicated by the solid fine line (c) of FIG. 12.

BRIEF SUMMARY OF THE INVENTION

In view of such problems of the prior art, a primary object of the present invention is to provide a variable ratio steering system for a vehicle which can maintain the relationship between the steering angle of the steering wheel and the behavior of the vehicle substantially constant without regard to the travelling speed of the vehicle.

A second object of the present invention is to provide a variable ratio steering system for a vehicle which provides a large steering angle with a relatively small steering input angle in a low speed range and prevents an overly sensitive behavior of the vehicle in a high speed range.

A third object of the present invention is to provide a variable ratio steering system for a vehicle which can vary the steering gear ratio in dependence on vehicle speed by using a simple mechanical arrangement.

These and other objects of the present invention can be achieved by providing a variable ratio steering system for a vehicle which can vary a ratio of a steering angle of steerable wheels to a steering angle of a steering wheel, comprising: a casing; a linearly moveable member supported in the casing in a linearly moveable manner; a rotatable member which is rotatably supported by the casing and engaged with the linearly moveable member so as to be linearly moveable jointly with the linearly moveable manner; rotational/linear movement conversion means for converting a rotational movement of the steering wheel into a linear movement of the linearly moveable member; linear/rotational movement conversion means for converting the linear movement of the linearly moveable member to a rotational movement of the rotatable member; and steering gear means for converting the rotational movement of the rotatable member to a steering movement of the steerable wheels. Preferably, the linear/rotational movement conversion means comprises conversion ratio varying means for varying a stroke of the linear displacement of the linearly moveable member for a given rotational angle of the rotatable member.

Thus, the steering gear ratio can be determined as desired by suitably designing the linear/rotational conversion means. According to such a structure, by making the axial displacement of the rotatable member required for achieving a steering angle of the steerable wheels, or for achieving a given rotational angle of the rotatable member variable, the maximum steering angle of the steering wheel can be made variable. More specifically, by increasing the axial displacement of the rotatable member required for achieving a given steering angle of the steerable wheels, a large steering input angle is required for accomplishing a large steering angle of the steerable wheels, and, by reducing the axial displacement of the rotatable member required for achieving a given steering angle of the steerable wheel, a large steering angle can be accomplished with a small steering input angle.

When such changes in the steering angle ratio are controlled so as to be as indicated by (d) in a low speed range and (e) in a high speed range, the rack stroke for a given steering angle of the steering wheel is reduced as compared to that of the conventional steering system, or a more insensitive (stable) property can be achieved in a high speed range, and is increased as compared to that of the conventional steering system, or a more sensitive (sharp) property can be achieved in a low speed range. The property of the practical steering angle based on this principle is indicated by the bold solid line (f) of FIG. 12.

According to a preferred embodiment of the present invention, the linear/rotational movement conversion means comprises follower means integrally provided in the rotatable member, and guide cam means which engages the follower means so as to convert the linear movement of the rotatable member into the rotational movement of the rotatable member. Preferably, the follower means comprises a pin projecting radially from the rotatable member, and the guide cam means comprises an outer ring supported by the casing so as to surround the rotatable member and extend in a plane which forms an oblique angle to an axial line of the rotatable member, and an inner ring which is received in the outer ring in a freely rotatable and coaxial manner, and a spherical joint connecting the pin with the inner ring, the conversion ratio varying means consisting of means for varying the oblique angle.

According to a preferred embodiment of the present invention featuring simplicity, the linearly moveable member and the rotatable member consist of a common member which is supported by the casing in both rotatable and linearly moveable manner, and the rotational/linear movement conversion means comprises a pinion provided in a steering shaft integrally connected to the steering wheel, and a plurality of annular teeth surrounding the common member and meshing with the pinion. Typically, the common member comprises a sector gear meshing with a rack gear connected to tie rods for steering the steerable wheels.

According to another preferred embodiment of the present invention, the rotatable member comprises a shaft member connected to the linearly moveable member via a bearing which allows relative rotation between the two members but engages the two members against relative linear movement, and a sector gear which is connected to the shaft member via a spline coupling and rotatably supported by the casing. The sector gear again meshes with a rack gear connected to tie rods for steering the steerable wheels. According to this embodiment, the rotational/linear movement conversion means may consist of a simple pinion and rack gear mechanism without any sliding movement therebetween, and the vehicle operator can steer the steering wheel in a smooth and play-free manner. The sector gear can likewise mesh with a rack gear without involving any sliding movement. In each case, the wear of the component parts can be reduced through elimination of sliding movement between two mutually meshing parts.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
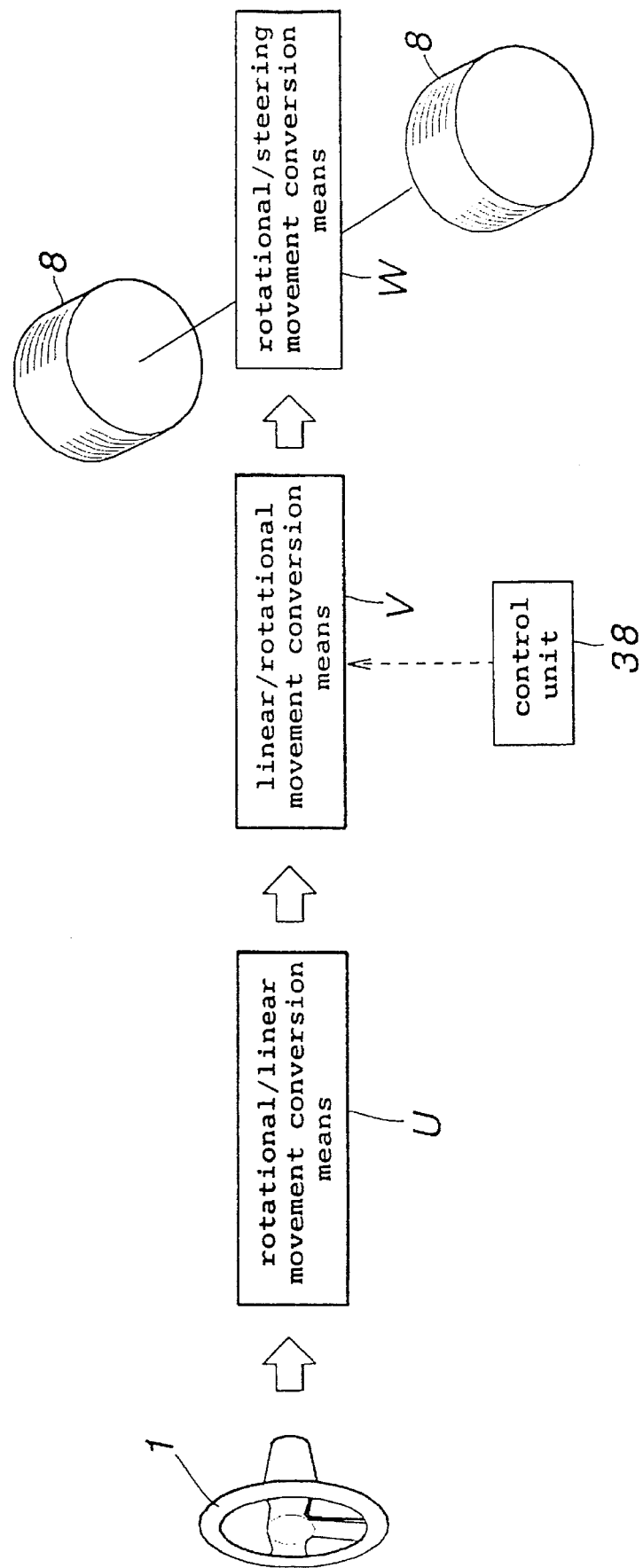
FIG. 1 is a conceptual structural view of the system of the present invention.

FIG. 1 conceptually illustrates the structure of the present invention. The steering input from a steering wheel 1 is supplied to rotational/linear movement conversion means U consisting of a rack and pinion mechanism, a ball screw mechanism or the like for converting a rotational movement around a prescribed axis into a linear movement. The linear movement of a linearly movable member obtained by the rotational/linear movement conversion means U is supplied to linear/rotational movement conversion means V. The linear/rotational movement conversion means V comprises a rotatable member integrally engaged with the linearly movable member so as to be jointly moveable for the linear movement but so as to be freely rotatable, and can continually vary the relationship between the axial linear displacement of the linearly movable member and the rotational angle of the rotatable member. The rotational angle of the rotatable member is converted into a steering movement for the steerable wheels movement by rotational/steering movement conversion means W consisting of a rack and pinion mechanism, a ball screw mechanism or the like for converting a rotational movement around a prescribed axis, normally, into a linear movement of tie rods, and this linear movement is applied to the steerable wheels 8 as a steering angle.

Figure 2:
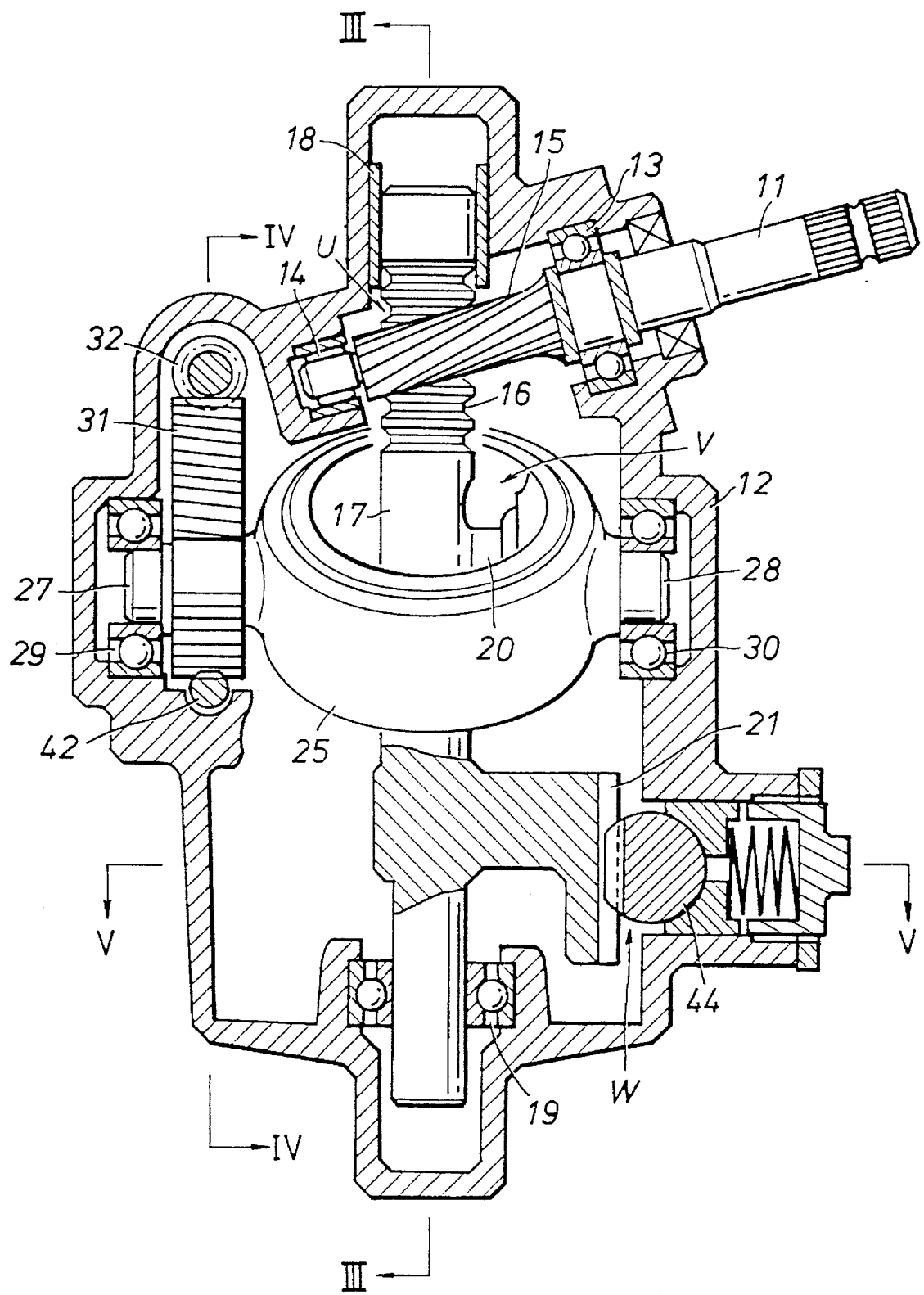
FIG. 2 is a vertical sectional view of the structure of a first embodiment of the variable ratio steering system according to the present invention.

FIG. 2 shows a first embodiment of the present invention. Referring to FIG. 2, an input shaft 11 connected to the steering wheel not shown in the drawing is rotatably supported on a gear case 12, which is mounted on a vehicle body not shown in the drawing, via a ball bearing 13 and a needle bearing 14. A part of the input shaft 11 received in the gear case 12 is formed as a pinion 15 having helical teeth which meshes with a conversion shaft 17 having a plurality of annular grooves 16 serving as rack teeth as seen in cross section over a certain length thereof. The pinion 15 and the conversion shaft 17 form the rotational/linear movement conversion means U.

The conversion shaft 17 is supported at its two ends so as to be both rotatable and axially moveable by bearings 18 and 19 provided in the gear case 12. An axially central part of the conversion shaft 17 integrally carries a pin 20 vertically projecting therefrom, and a part of the conversion shaft 17 slightly lower than the pin 20 is integrally formed with a sector gear 21.

Figure 3:
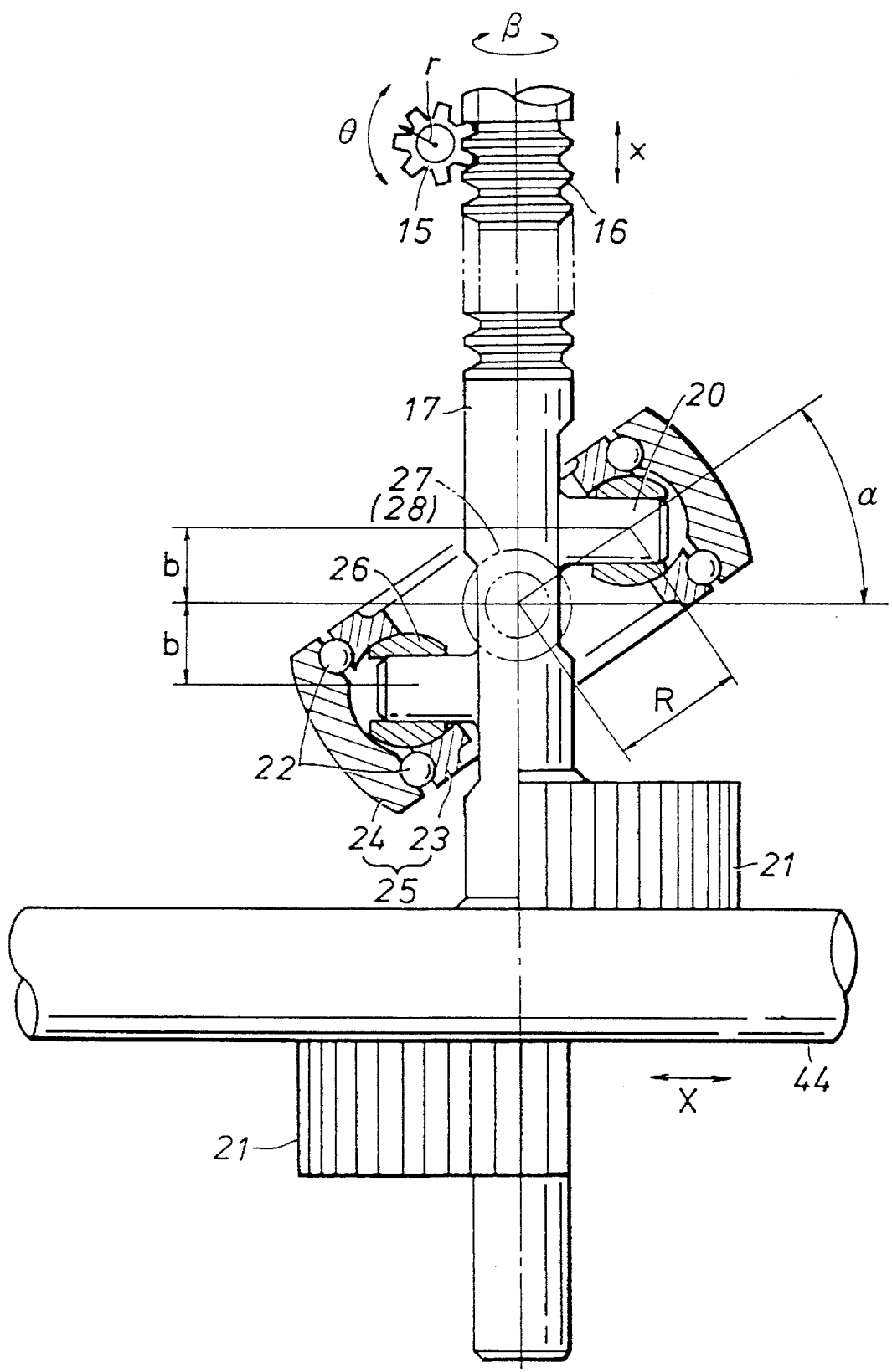
FIG. 3 is a sectional view taken along line III—III of FIG. 1.

Referring also to FIG. 3, there is provided a cylindrical rocking movement member 25 consisting of an inner ring 23 and an outer ring 24 which are coaxially engaged with each other so as to be freely rotatable relative to each other via a plurality of balls 22 arranged in two rows, and the pin 20 projecting from the conversion shaft 17 engages with the inner ring 23 via a spherical bush 26 received in a complementary socket provided in the inner ring 23. The outer ring 24 of the rocking movement member 25 is rotatably supported by the gear case 12 by means of a pair of trunnion shafts 27 and 28 integrally and radially projecting from the outer wheel 24 and ball bearings 29 and 30 rotatably supporting the trunnion shafts 27 and 28, respectively.

The trunnion shaft 27 illustrated on the left hand side of FIG. 2 is integrally formed with a sector-shaped worm wheel 31, which engages at its upper portion with a worm 32.

Figure 4:
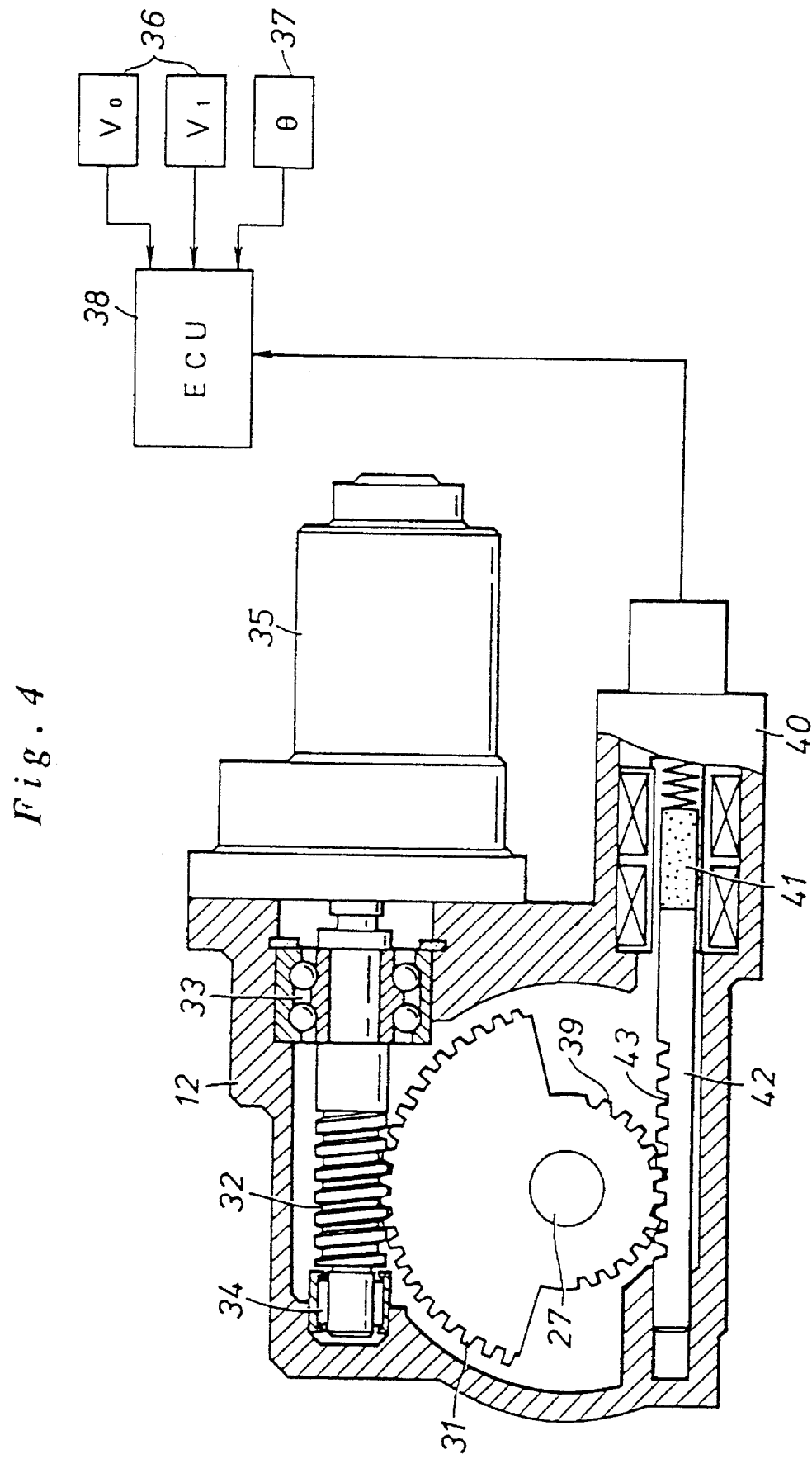
FIG. 4 is a sectional view taken along line IV—IV of FIG. 1.

Referring to FIG. 4, the worm 32 is supported at its two ends by the gear case 12 so as to be immovable in the axial direction but freely rotatable by a ball bearing 33 capable of supporting a thrust load and a needle bearing 34. The worm 32 is rotatably driven by an electric motor 35 incorporated with a gear reduction unit, and, as the worm 32 is turned, the worm wheel 31 is turned, and the angle of inclination a of the rocking movement member 25 integrally connected to the worm wheel 31 changes accordingly.

At this point, if the rotation of the electric motor 35 is controlled by an output signal from a control unit 38 according to output signals from a vehicle speed sensor 36 and a steering angle sensor 37, the inclination angle a of the rocking movement member 25 changes accordingly. When a thrust force is applied to the conversion shaft 17 by the rotation of the pinion 15, because the rocking movement member 25 is inclined and the pin 20 rotates integrally with the inner ring 23, the conversion shaft 17 turns at the same time as moving linearly. The inner ring 23 can rotate relative to the outer ring 24 by 180 degrees at maximum, and, by changing the inclination angle a of the rocking movement member 25, the stroke of the axial displacement of the pin 20 alone can be changed without changing the maximum rotational angle of the conversion shaft 17. These components form the linear/rotational movement varying means V.

The worm wheel 31 is integrally provided with a sector gear 39 at its lower part as seen in FIG. 4. With this sector gear 39 meshes a rack gear 43 of a rack shaft 42 integrally connected to an iron core 41 of a differential transformer 40. Thus, the rack shaft 42, along with the iron core 41, is axially moved according to the rotational angle of the worm wheel 31 or according to the inclination angle α of the rocking movement member 25, and this axial displacement, detected from an output of the differential transformer 40, is supplied to the control unit 38 as the inclination angle α of the rocking movement member 25.

Figure 5:
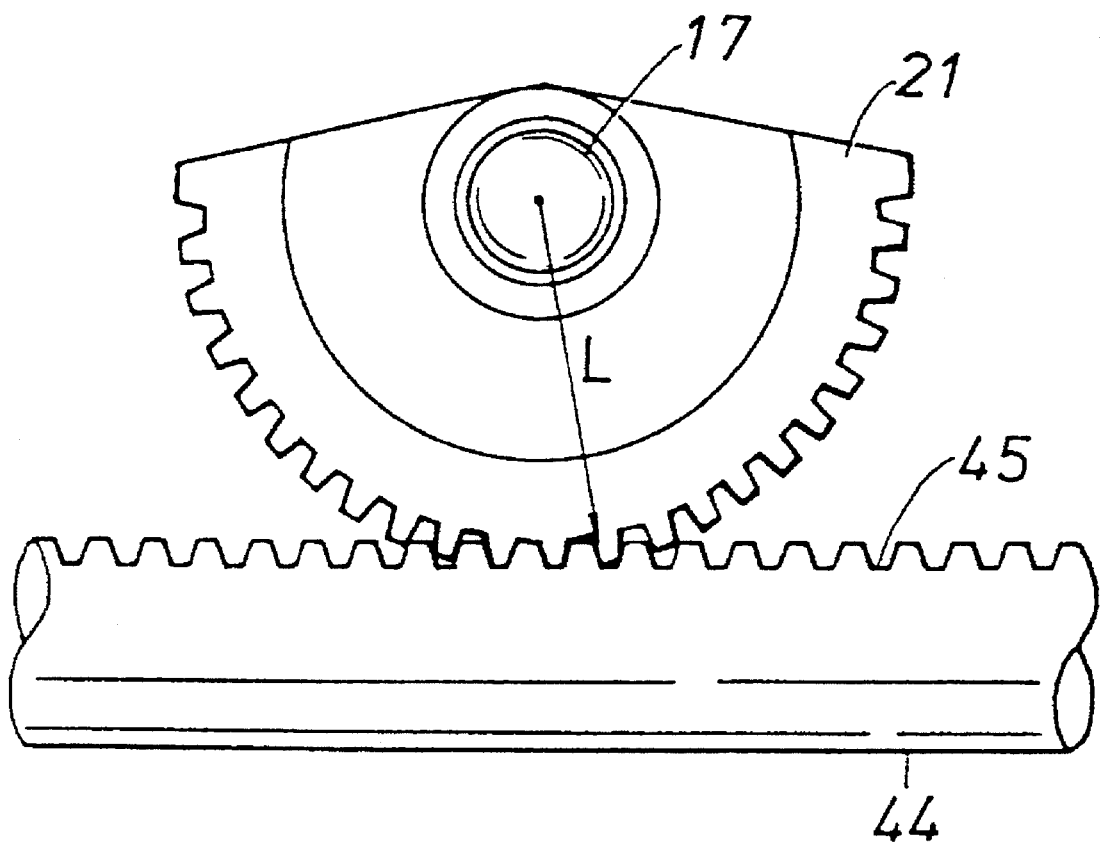
FIG. 5 is a sectional view taken along line V—V of FIG. 1.

Meanwhile, the sector gear 21 integrally formed in a lower part of the conversion shaft 17 meshes with rack gear 45 of a rack shaft 44 connected to the steerable wheels 8 as illustrated in FIG. 5, and the rotational movement of the conversion shaft 17 is converted into an axial linear movement of the rack shaft 44. These components form the rotational/steering movement conversion means W.

Now the working principle of the present embodiment is described in the following. If the rotational radius and the rotational angle of the pinion 15 are given by r and θ, respectively, the axial displacement x of the conversion shaft 17 is given as follows.

$$x = r \cdot \theta \quad (1)$$

If the radial distance of a point of engagement between the inner ring 23 of the rocking movement member 25 and the pin 20 of the conversion shaft 17 from the center of rotation of the rocking movement member 25 is given by R and the rotational angle of the conversion shaft 17 is given by β, the axial displacement x of the conversion shaft 17 is given as follows.

$$x = R \cdot \sin\alpha \cdot \sin\beta \quad (2)$$

It should be noted that there is a non-linear relationship between the rotational angle β of the conversion shaft 17 and the corresponding linear displacement x of the conversion shaft 17, and the increase in the rotational angle β for a given stroke of the conversion shaft 17 becomes greater as the displacement of the conversion shaft 17 increases. This produces an effect similar to that of the conventional variable gear ratio steering system whose gear ratio varies depending on the magnitude of the input steering angle.

In any case, from equations (1) and (2), one can obtain the following equation.

$$\beta = \sin^{-1}\{r \cdot \theta / (R \cdot \sin\alpha)\}$$

If the rotational radius of the sector gear 21 is given by L, the axial displacement X of the rack shaft 44 is given as follows.

$$\begin{aligned} X &= L \cdot \beta \\ &= L \cdot \sin^{-1}\{r \cdot \theta / (R \cdot \sin\alpha)\} \end{aligned} \quad (3)$$

Figure 6:
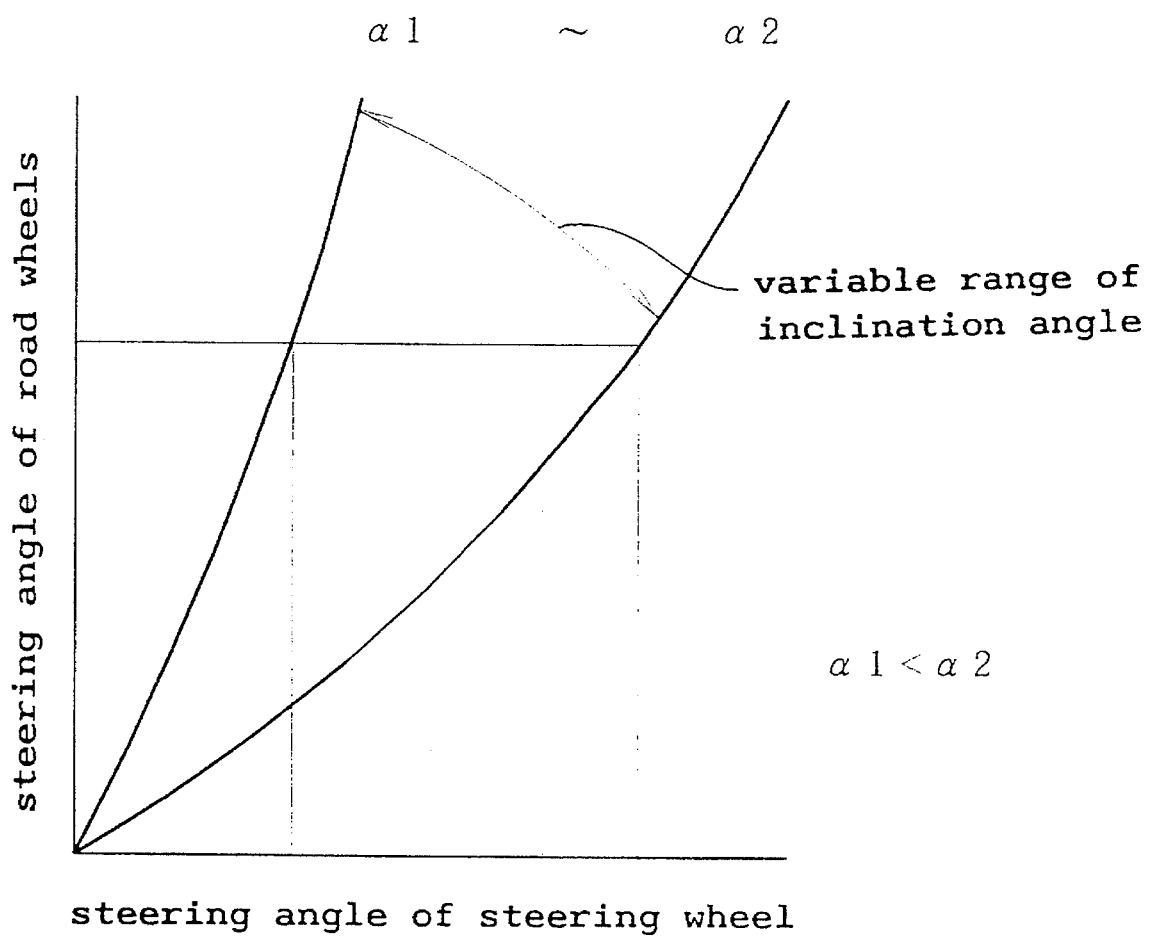
FIG. 6 is a graph showing the relationship between the steering angle of the steering wheel and the steering angle of the road wheels.

Therefore, by varying the inclination angle α of the rocking movement member 25, the ratio of the axial displacement X of the rack shaft 44 (the rotational angle β of the sector gear 21 and the conversion shaft 17) to the axial displacement x of the conversion shaft 17, or the steering angle ratio, can be changed in such a manner that the rotational angle θ of the steering wheel 1 for a given steering angle of the steerable wheels 8 progressively increases as the inclination angle of the rocking movement member 25 is increased from α1 to α2 as illustrated in FIG. 6.

Figure 7:
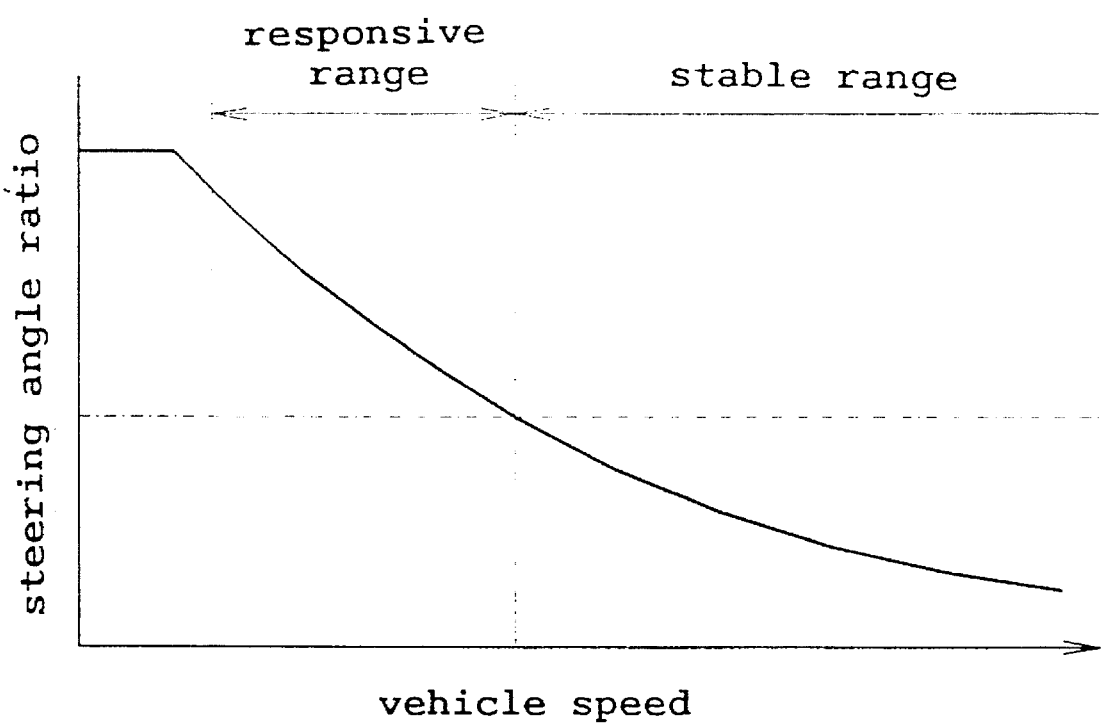
FIG. 7 is a diagram showing the steering angle ratio in relation with the vehicle speed.

Thus, by changing the inclination angle a of the rocking movement member 25 according to the signal from the vehicle speed sensor 36, the steering angle ratio (X/θ) can be changed in relation with the vehicle speed in such a manner that a large steering angle can be obtained with a small steering input in a low speed range and an excessively sensitive response can be prevented in a high speed range as shown in FIG. 7. Two vehicle speed sensors 36 are used as a measure against possible failure of one of the vehicle speed sensors.

Figure 8:
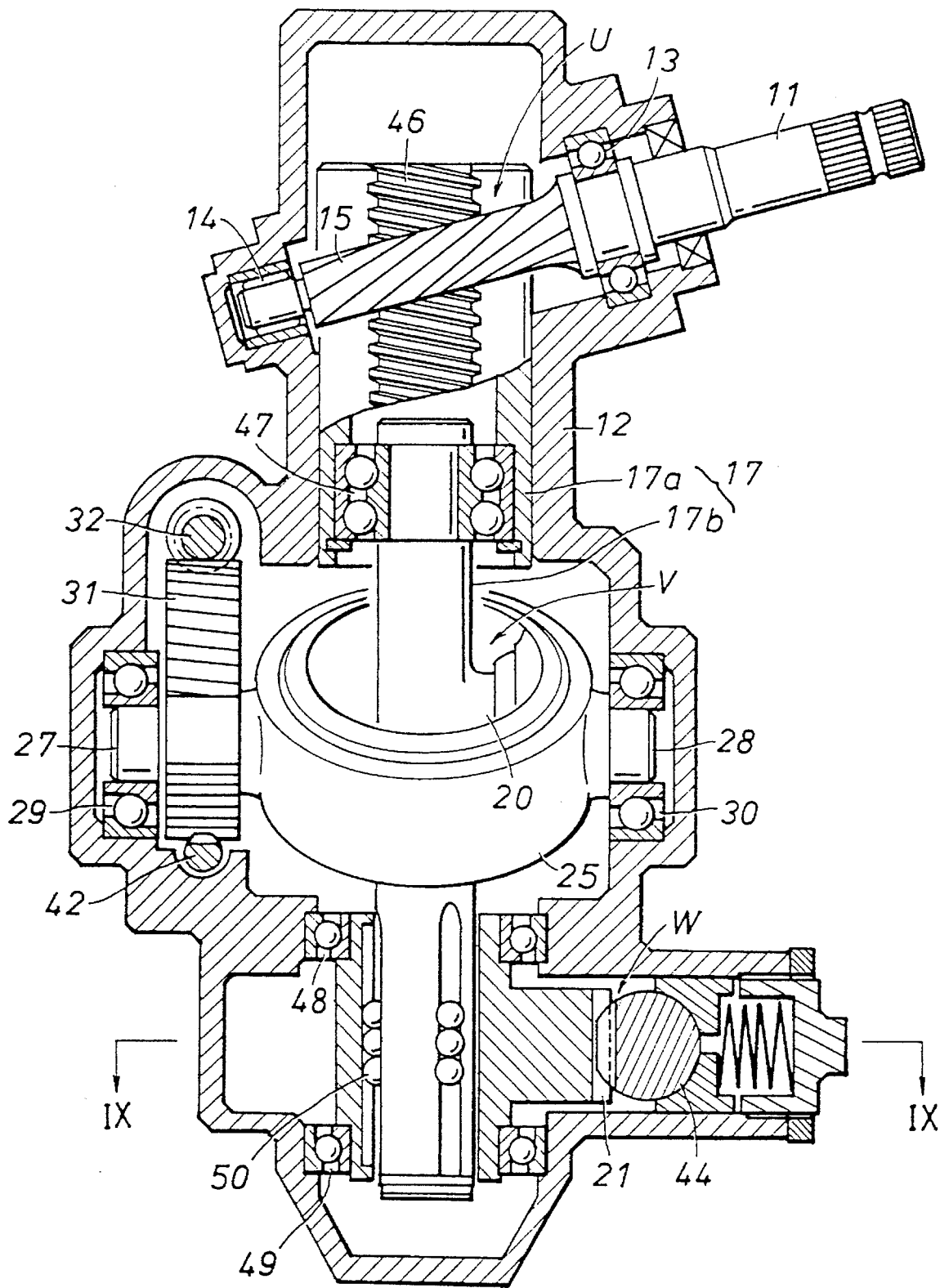
FIG. 8 is a vertical sectional view showing the structure of a second embodiment of the variable ratio steering system according to the present invention.
Figure 9:
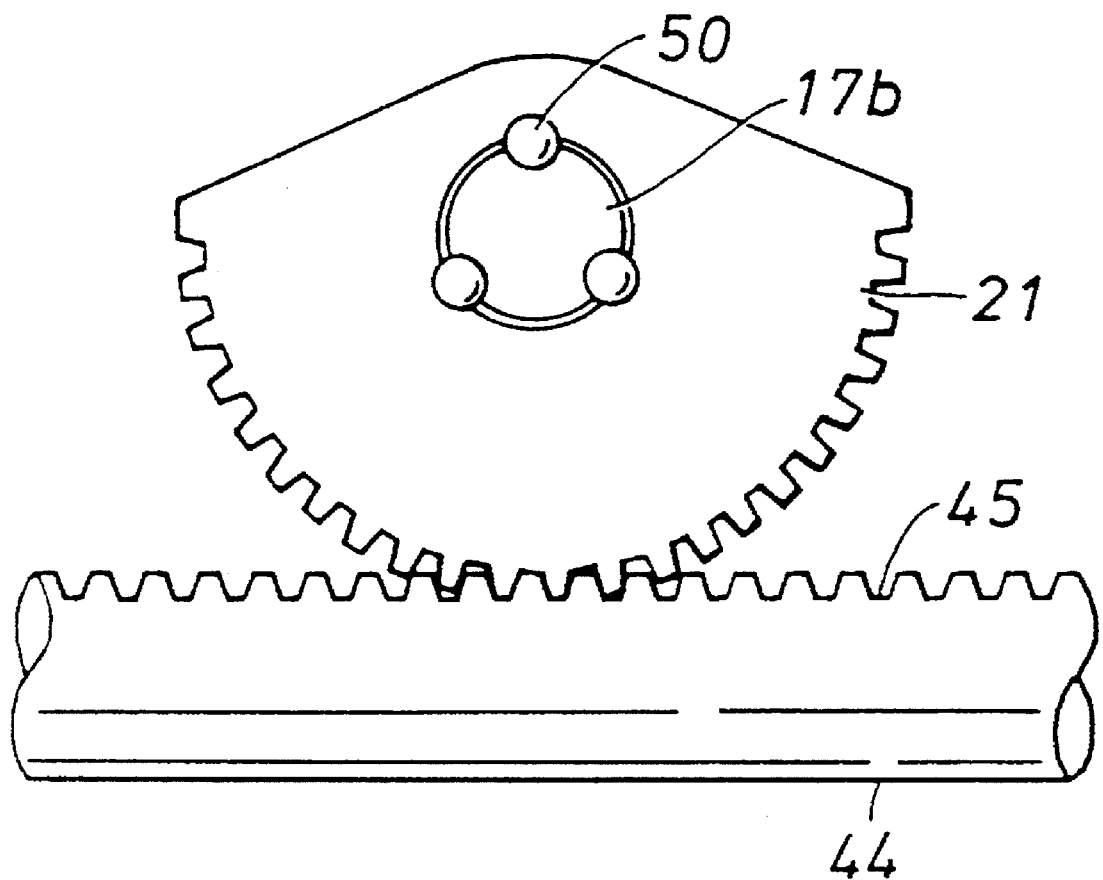
FIG. 9 is a sectional view taken along line IX—IX of FIG. 8.
Figure 10:
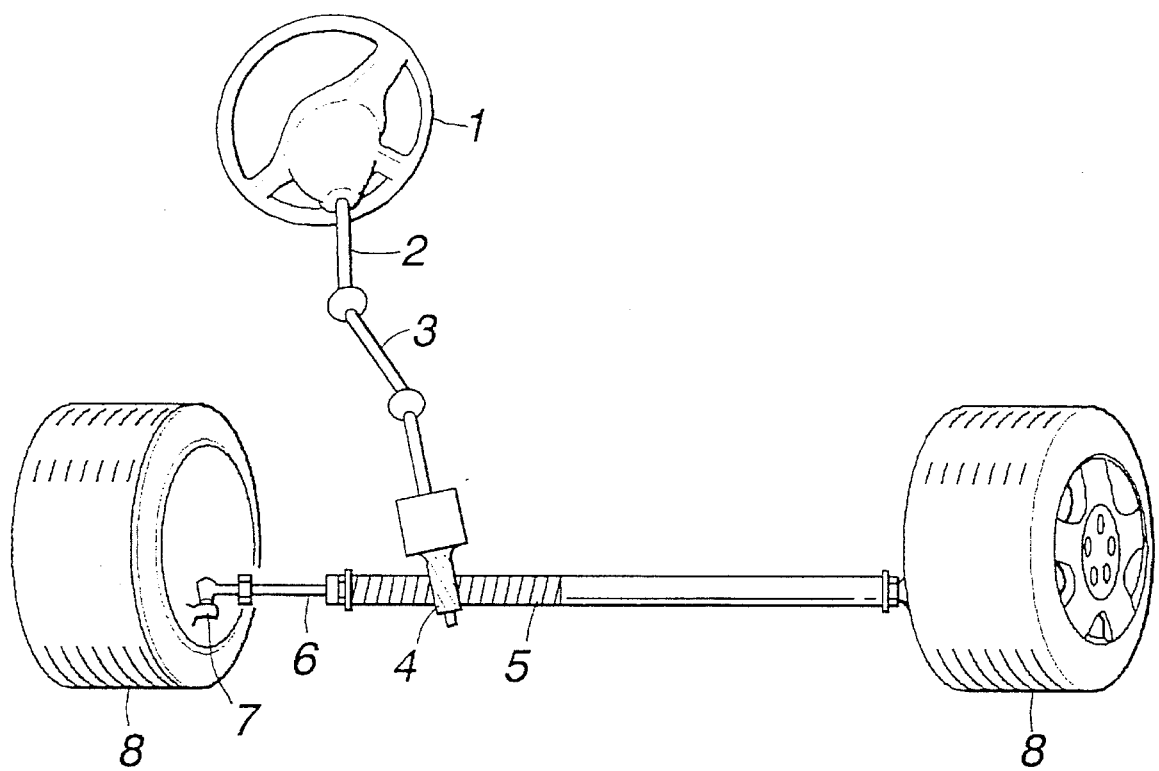
FIG. 10 is a simplified diagrammatic view of a steering system to which the present invention is applied.
Figure 11:
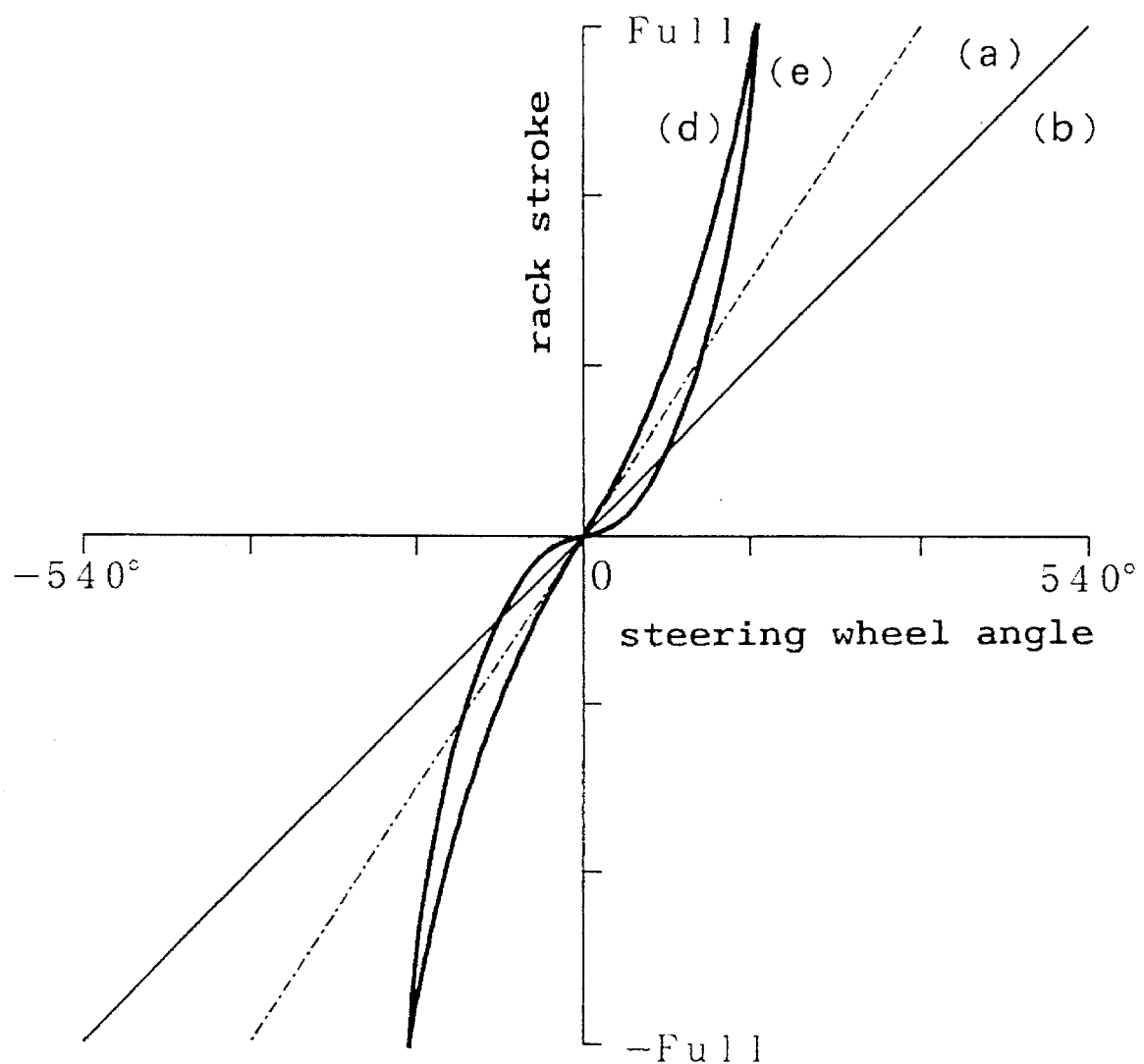
FIG. 11 is a graph showing different steering angle ratio properties.
Figure 12:
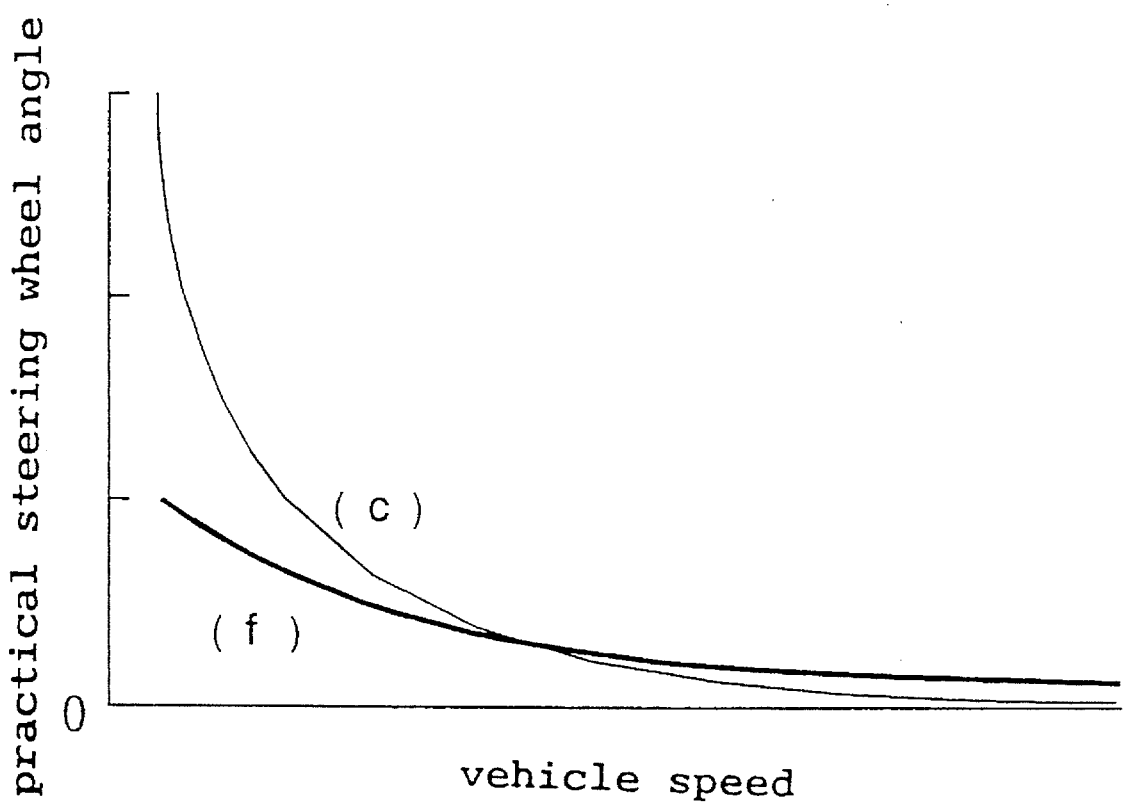
FIG. 12 is a graph showing typical steering angles in relation with the vehicle speed.

Now a second embodiment of the present invention is described in the following with reference to FIGS. 8 and 9. The parts corresponding to those of the first embodiment are denoted with like numerals without repeating detailed description thereof. In this embodiment, the conversion shaft 17 is divided into two parts. The first part 17a of the conversion shaft 17 has a cylindrical shape, and a rack gear 46 formed along a part of the outer circumferential surface of the first part 17a meshes with the pinion 15 so as to form the first rotational/linear movement conversion means U.

The second part 17b of the conversion shaft 17 is rotatably connected to the first part 17a via a ball bearing 47. As a result, the axial linear movement of the first part 17a is directly transmitted to the second part 17b, but the rotation of the second part 17b is not transmitted to the first part 17a.

The sector gear 21 is rotatably supported at its two ends by the gear case 12 via ball bearings 48 and 49, and in turn supports a lower part of the second part 17b on a central axial line of the sector gear 21 so as to allow the axial linear movement of the second part 17b via a ball serration coupling 50.

Thus, there is formed the rotational/steering movement conversion means W in which the rotational movement of the second part 17b is transmitted to the sector gear 21, and the rotational movement of the sector gear 21 is converted into the linear movement of the rack shaft 44.

According to the second embodiment, as opposed to the first embodiment, the rack gear 46 of the rotational/linear movement conversion means U does not rotate, and the resulting smooth meshing therebetween improves the steering feeling and increases durability by reducing wears resulting from sliding action.

It is obvious that the rocking movement member 25 can be inclined over a range of frictional angle which allows the conversion shaft 17 to be rotated by the axial thrust force applied thereto.

According to such a structure of the present invention, because a nonlinear relationship can be established between the input angle and the output angle by a purely mechanical power transmission system, and this non-linear relationship can be varied in dependence on vehicle speed, a favorable maneuverability when parking the vehicle, a responsive handling of the vehicle in a low to medium speed range, and a stable behavior in a high speed range can be obtained with an extremely simple structure.

Although the present invention has been described in terms of preferred embodiments thereof, it is obvious to a person skilled in the art that various alterations and modifications are possible without departing from the scope of the present invention which is set forth in the appended claims.

What we claim is:

1. A variable ratio steering system for a vehicle which can vary a ratio of a steer angle of steerable wheels to a steering angle of a steering wheel, comprising:

a casing;

a linearly moveable and rotatable member supported in said casing so as to be movable in a linearly moveable and rotatable manner;

rotational to linear movement conversion means for converting a rotational movement of said steering wheel to a linear movement of said linearly moveable and rotatable member;

linear to rotational movement conversion means for converting said linear movement of said linearly moveable and rotatable member to a rotational movement of said linearly moveable and rotatable member; and steering gear means for converting said rotational movement of said linearly moveable and rotatable member into a steering movement of said steerable wheels.

2. A variable ratio steering system for a vehicle according to claim 1, wherein said linear to rotational movement conversion means comprises conversion ratio varying means for varying a stroke of linear displacement of said linearly moveable and rotatable member for a given rotational angle of said linearly moveable and rotatable member 3. A variable ratio steering system for a vehicle according to claim 2, wherein said linear to rotational movement conversion means comprises follower means integrally provided with said linearly moveable and rotatable member, and guide cam means which engages said follower means so as to convert said linear movement of said linearly moveable and rotatable member into said rotational movement of said linearly movable and rotatable member.

4. A variable ratio steering system for a vehicle according to claim 3, wherein said follower means comprises a pin projecting radially from said linearly moveable and rotatable member, and said guide cam means comprises an outer ring supported by said casing so as to surround said linearly moveable and rotatable member and extend in a plane which forms an oblique angle to an axial line of said linearly moveable and rotatable member, and an inner ring which is received in said outer ring in a freely rotatable and coaxial manner, and a spherical joint connecting said pin with said inner ring, said conversion ratio varying means comprising means for varying said oblique angle.

5. A variable ratio steering system for a vehicle according to claim 1, wherein said rotational to linear movement conversion means comprises a pinion provided in a steering shaft integrally connected to said steering wheel, and a plurality of annular teeth surrounding said linearly moveable and rotatable member and meshing with said pinion.

6. A variable ratio steering system for a vehicle according to claim 5, wherein said linearly movable and rotatable member comprises a sector gear meshing with a rack gear connected to tie rods for steering said steerable wheels.

7. A variable ratio steering system for a vehicle according to claim 1, wherein said linearly moveable and rotatable member comprises a shaft member and a bearing which allows relative rotation of said linearly movable and rotatable member to said bearing but engages against relative linear movement of said linearly movable and rotatable member to said bearing, and a sector gear which is connected to said shaft member via a spline coupling and meshes with a rack gear connected to tie rods for steering said steerable wheels.

* * * * *